(12) United States Patent
Pratt et al.

(10) Patent No.: US 9,788,073 B2
(45) Date of Patent: *Oct. 10, 2017

(54) METHOD AND APPARATUS FOR SELECTION AND PRESENTATION OF MEDIA CONTENT

(71) Applicant: AT&T INTELLECTUAL PROPERTY I, LP, Atlanta, GA (US)

(72) Inventors: James Pratt, Round Rock, TX (US); Keith Crowe, Austin, TX (US); Marc Sullivan, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/188,149

(22) Filed: Jun. 21, 2016

(65) Prior Publication Data

US 2016/0301980 A1   Oct. 13, 2016

Related U.S. Application Data

(63) Continuation of application No. 14/754,816, filed on Jun. 30, 2015, now Pat. No. 9,402,105, and a continuation of application No. 13/687,422, filed on Nov. 28, 2012, now Pat. No. 9,100,699.

(51) Int. Cl.
| | |
|---|---|
| H04N 21/482 | (2011.01) |
| H04N 21/478 | (2011.01) |
| H04N 21/462 | (2011.01) |
| H04N 21/472 | (2011.01) |

(52) U.S. Cl.
CPC ..... *H04N 21/4828* (2013.01); *H04N 21/4621* (2013.01); *H04N 21/4622* (2013.01); *H04N 21/478* (2013.01); *H04N 21/47202* (2013.01)

(58) Field of Classification Search
CPC ............. H04N 21/4828; H04N 21/478; H04N 21/4621; H04N 21/47202; H04N 21/4622
See application file for complete search history.

(56) References Cited

U.S. PATENT DOCUMENTS

| | | | |
|---|---|---|---|
| 5,543,857 A | 8/1996 | Wehmeyer | |
| 6,870,573 B2 | 3/2005 | Yeo et al. | |
| 2005/0066068 A1 | 3/2005 | Karaoguz et al. | |
| 2006/0064719 A1 | 3/2006 | Youden | |
| 2006/0190974 A1 | 8/2006 | Lee | |
| 2006/0194535 A1 | 8/2006 | Houldsworth et al. | |

(Continued)

*Primary Examiner* — Benjamin R Bruckart
*Assistant Examiner* — Aklil Tesfaye
(74) *Attorney, Agent, or Firm* — Guntin & Gust, PLC; Atanu Das

(57) ABSTRACT

A method that incorporates teachings of the subject disclosure may include, for example, capturing from a plurality of media sources information describing a plurality of media content offered at the plurality of media sources, generating a plurality of exemplars of the plurality of media content offered at the plurality of media sources based on the information captured from the plurality of media sources, presenting the plurality of exemplars at a display, receiving a selection of a first exemplar of the plurality of exemplars, and presenting a portion of first media content associated with a first media source of the plurality of media sources associated with the first exemplar based on the information captured from the plurality of media sources responsive to the selection of the first exemplar. Other embodiments are disclosed.

20 Claims, 7 Drawing Sheets

(56) References Cited

U.S. PATENT DOCUMENTS

| | | |
|---|---|---|
| 2007/0157240 A1 | 7/2007 | Walker |
| 2007/0204297 A1 | 8/2007 | Gonzalez |
| 2008/0148152 A1 | 6/2008 | Blinnikka et al. |
| 2009/0019479 A1 | 1/2009 | Kwak et al. |
| 2009/0201420 A1 | 8/2009 | Brown |
| 2009/0217320 A1 | 8/2009 | Aldrey |
| 2009/0260040 A1 | 10/2009 | Kritt |
| 2009/0293079 A1 | 11/2009 | McKee |
| 2010/0031299 A1 | 2/2010 | Harrang et al. |
| 2010/0231790 A1 | 9/2010 | Ansari |
| 2012/0102524 A1 | 4/2012 | Goldschmidt Iki et al. |
| 2012/0297421 A1 | 11/2012 | Kim et al. |
| 2013/0051755 A1 | 2/2013 | Brown et al. |
| 2013/0145406 A1 | 6/2013 | Baskaran et al. |
| 2014/0109144 A1 | 4/2014 | Asnis et al. |

METHOD AND APPARATUS FOR SELECTION AND PRESENTATION OF MEDIA CONTENT

CROSS-REFERENCE TO RELATED APPLICATIONS

This application is a Continuation of and claims priority to U.S. patent application Ser. No. 14/754,816, filed Jun. 30, 2015, which is a Continuation of and claims priority to U.S. patent application Ser. No. 13/687,422, filed Nov. 28, 2012 issued as U.S. Pat. No. 9,100,699. The contents of each of the foregoing is/are hereby incorporated by reference into this application as if set forth herein in full.

FIELD OF THE DISCLOSURE

The subject disclosure relates to a method and apparatus for selection and presentation of media content.

BACKGROUND

Media content is typically experienced by consumers via devices such as computers, televisions, radios, and mobile electronics. Media content is delivered by service providers, who send the content, such as television, radio, and video programming, to consumers for enjoyment at their physical locations. Modern communications networks benefit from interconnectivity between consumers and various communication devices. As network capabilities expand, these interconnections provide new opportunities to enhance the ability for consumers to enjoy media content by experiencing a variety of content over multiple devices. Intelligent devices offer means for the enjoyment of content in ways that anticipate consumer personalizations of media content presentation.

BRIEF DESCRIPTION OF THE DRAWINGS

Reference will now be made to the accompanying drawings, which are not necessarily drawn to scale, and wherein.

DETAILED DESCRIPTION

Figure 1:
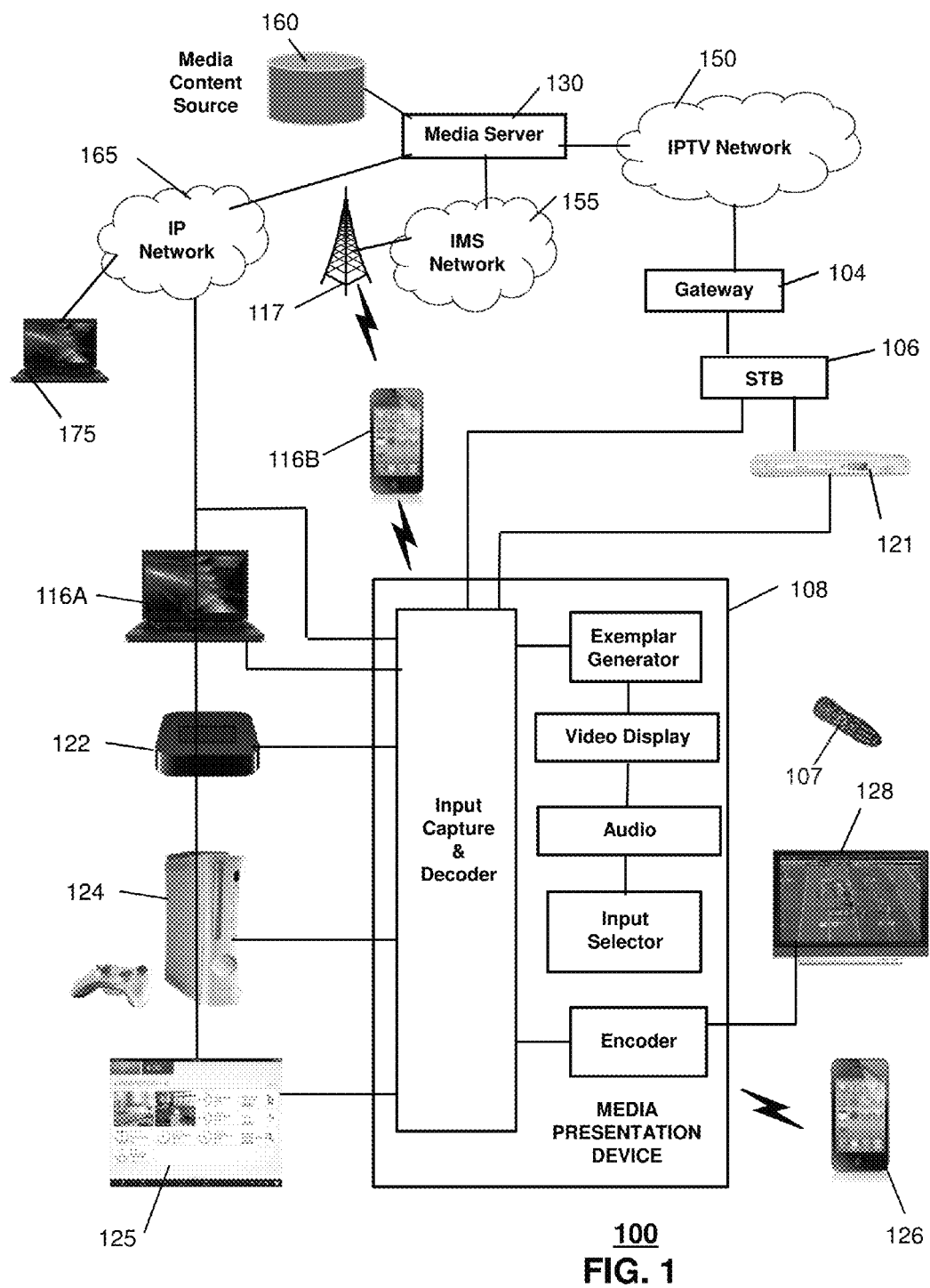
FIG. 1 depicts an illustrative embodiment of a system that can be utilized for selecting and presenting media content in a networked media content system.

The subject disclosure describes, among other things, illustrative embodiments for detecting media sources at inputs to a media presentation system and capturing information associated with media content that is currently available at the media sources. Exemplars can be generated and presented at the media presentation system to inform a user of the system of the media content available at the media sources. Selection of any of the exemplars can cause the media presentation system to present a preview portion of the media content based on the captured information from the associated media source or can present the entirety of the media content based on an encoded media stream received from the media source. The media content can be re-encoded by the media presentation system and transmitted to a receiving device. Other embodiments are included in the subject disclosure.

One embodiment of the subject disclosure includes a memory storing computer instructions and a processor coupled to the memory. The processor can perform operations responsive to executing the computer instructions including scanning a plurality of inputs to detect a plurality of media sources that are communicatively coupled. The processor can also perform operations for capturing from the plurality of media sources information describing a plurality of media content offered at the plurality of media sources. The processor can further perform operations for generating a plurality of exemplars of the plurality of media content offered at the plurality of media sources based on the information captured from the plurality of media sources. The processor can perform operations for presenting the plurality of exemplars at a display and, in turn, receiving a selection of a first exemplar of the plurality of exemplars. The processor can further perform operations for receiving a first encoded data stream representing first media content of a first media source of the plurality of media sources associated with the first exemplar responsive to the selection of the first exemplar. The processor can further perform operations for decoding the first encoded data stream to generate a first media stream of the first media content and, in turn, presenting the first media stream at the display.

One embodiment of the subject disclosure includes a tangible computer-readable storage medium including computer instructions, which, responsive to being executed by a processor, can cause the processor to perform operations for capturing from a plurality of media sources communicatively coupled to a device information describing a plurality of media content offered at the plurality of media sources. The computer instructions can cause the processor to perform operations for generating a plurality of exemplars of the plurality of media content offered at the plurality of media sources based on the information captured from the plurality of media sources. The computer instructions can cause the processor to perform operations for presenting the plurality of exemplars at a display and, in turn, receiving a selection of a first exemplar of the plurality of exemplars. The computer instructions can cause the processor to perform operations for encoding a first media stream of first media content of a first media source of the plurality of media sources associated with the first exemplar responsive to the selection of the first exemplar and, in turn, transmitting the encoded output media stream to a receiving media device communicatively coupled to the device for presentation at the receiving media device.

One embodiment of the subject disclosure includes a method including capturing, by a system comprising a processor, from a plurality of media sources information describing a plurality of media content offered at the plurality of media sources. The method also includes generating, by the system, a plurality of exemplars of the plurality of media content offered at the plurality of media sources based on the information captured from the plurality of media sources. The method further includes presenting, by the system, the plurality of exemplars at a display and, in turn, receiving a selection of a first exemplar of the plurality of exemplars. The method includes presenting, by the system, a portion of first media content associated with a first media source of the plurality of media sources associated with the first exemplar based on the information captured from the plurality of media sources responsive to the selection of the first exemplar.

FIG. 1 an illustrative embodiment of a system 100 that can be utilized for selecting and presenting media content in a networked media content system. In one embodiment, the system 100 can be a subscription content service. For example, the subscription content service can be part of a cable, satellite, fiber optic, and/or DSL based media content delivery system. The media content can be any type of viewable content, such as broadcast television, cable or premium television, video on demand, or pay-per-per view television. In one embodiment, the system 100 can include one or more media servers 130 that can receive media content from one or more media content sources 160. Media servers 130 can provide media content to one or more delivery networks 150, 155, and 165. For example, a media server 130 can deliver media content services via an internet protocol television (IPTV) network 150, an internet protocol multimedia subsystem network 155, and/or an internet protocol network.

In one embodiment, media content is routed to the IPTV network 150, which, in turn can deliver media content to a gateway device 104. In turn, the gateway device 104 can route media content to a media processor device 106, such as a set-top box. In another embodiment, the media server 130 can deliver media content by the IMS network 155 to a mobility network 117. The mobility network 117 can route media content to a mobile communication device 116B, such as a wireless smart phone, via a cellular, long term evolution (LTE), third generation (3G), and/or fourth generation (4G) wireless networks. In another embodiment, the media server 130 can deliver media content over a public IP network 165. In turn, the IP network 165 can deliver media content to devices 116A, 122, 124, and 125. For example, the IP network 165 can delivery media content to a mobile computer device 116A, a streaming device 122, a gaming console 124, and/or a home security system 125.

The system 100 can further include authentication functions to insure that media content is distributed only to verified subscribers to the system 100 according to the service plan levels of those subscribers. For example, the system 100 can verify that media processor device 106 is be properly identified and validated for receiving media content over the system 100. For example, an authentication server can be used to verify the subscription status of the media processor device 106. Device identifying information, such as MAC address, IP address, and/or SIM card information, can be transmitted to the authentication server. The authentication server can use this identifying information from the media processor device 106 to inquire at a subscriber database of service plan information for a subscriber who is associated with the device 106. The subscriber database can provide subscription status and service plan information to allow the authentication server to enable delivery of purchased media content to the media processor device 106. In one or more embodiments, the media content can be selected based on a number of techniques and criteria, such as based on user input, user preferences, user profiles, monitored user viewing history, and so forth.

In one embodiment, the gateway device 104 can function as an interface between the IPTV network 155 and the media processor device 106. In one embodiment, the gateway device 104 can provide internet working functions, such as protocol translation, impedance matching, data rate conversion, and/or fault isolation necessary for exchanging data between the IPTV network 150 and the home-based media processor device 106.

In one embodiment, the media processor device 106 can receive media content as encoded data packet streams and can decode the received data streams into decoded streams that can be delivered to the media presentation device 108 for reproduction of video and audio content. In other embodiments, the media processor device 106 can further perform functions of providing an electronic programming guide for selection of programming from the media server 130, authentication of the media processor device 106 for reception of media content, storage and updating of user preferences, and/or parental control of media content. In one embodiment, the media processor device 106 can be configured with custom user settings to control operations of the program guide, such as channel display order, favorites, channel hiding, and operations of an internal digital video recorder function. In one embodiment, one or more aspects of customer user settings and/or programming stored on an internal digital video recorder function can be replicated at the IPTV network 105 or at a cloud-based storage location. In one embodiment, the media processor device 106 can be integrated into the media presentation device 108. In another embodiment, the media processor device 106 can be coupled to an external digital video recording device 121. In another embodiment, a digital video recording device 121 can deliver media content to the media presentation device 108.

In several embodiments, the media presentation device 108 can include an input capture module, a decoder module, an exemplar module, video display and audio modules, an input selector module, and an encoder module. In one embodiment, the functionality of the media presentation device 108 is integrated into a television device. In one embodiment, the input capture module can include a set of input channels for receiving inputs from several different media sources, such as but not limited to a media processor device 106, a digital video recorder device 121, a computer device 116A, a wireless mobile communication device 116B, a streaming media device 122, a gaming console device 124, and/or a home security system device 125. In one embodiment, the media presentation device 108 can receive media content directly from the IP network 165. In one embodiment, the media presentation device 108 can capture several different input signal types and/or protocols. For example, the input capture module can capture high-definition multimedia interface (HDMI), audio-visual (AV), composite component inputs, separate video (s-video), transmission control protocol/internet protocol (TCP-IP), wireless fidelity (Wi-Fi), wireless display (Wi-Di), wireless Bluetooth, wireless ZigBee, wireless HDMI, and/or digital coaxial cable. In one embodiment, the input capture module can scan several input channels for input signals. The input capture module can determine which, if any, of the input channels is currently connected to an active media source. For example, the input capture module can determine if an input source, such as the streaming device 122, is in turned ON and/or initialized to receive media content from the IP network 165.

In one embodiment, the media presentation device 108 can capture information from each input channel that is coupled to an active media source. For example, if the media presentation device 108 determines that the media processor device 106 is in an active state, then the input capture module can capture information detailing the current media source conditions at the media processor device 106. For example, if the input capture module can receive data from the media processor device 106 describing the currently-tuned programming channel. The media presentation device 108 can receive descriptive programming information associated with the currently-tuned channel, such as channel number, broadcaster name, program title, program date, brief program description, and/or closed captioning information. In another embodiment, the media presentation device 108 can receive data describing an upcoming media program at the currently-tuned channel. In another embodiment, the media presentation device 108 can receive video streaming data from the media processor device 106. For example, the input capture module can receive streaming data from the currently-tuned channel In one embodiment, the input capture module can capture a sample of the streaming data. For example, the media presentation device 108 can capture the last 10 seconds of the media content streaming at the currently-tuned channel. In another example, the media presentation device 108 can capture a sample from an upcoming media program at the currently-tuned channel.

In one embodiment, the media presentation device 108 can capture information describing available programming at a digital video recording device 121. For example, the media presentation device 108 can receive descriptive programming information associated with a currently-installed digital video recording disk or a currently-selected digitally-stored media program, such as program title, program date, brief program description, and/or closed captioning information. In another embodiment, the media presentation device 108 can receive video streaming data from the media processor device 106, such as a brief preview video.

In one embodiment, the media presentation device 108 can capture information describing programming that is currently available from a mobile communication device 116B. The media content can be, for example, content that is locally stored at the mobile communication device 116B, such as previously downloaded video and/or audio content or content that is captured using a video camera at the mobile communication device 116B. The media content can alternatively be programming content delivered to the mobile communication device 116B from the IMS network 155. In one embodiment, the media presentation device 108 can receive descriptive programming information associated with the content available at the mobile communication device 116B, such as program title, program date, and/or a brief program description. In another embodiment, the media presentation device 108 can receive video streaming data from the mobile communication device 116B, such as a brief preview video.

In one embodiment, the media presentation device 108 can capture information describing programming that is currently available from a computer device 116A, 122, and 124 that is connected to an IP network 165. The media content can be, for example, content that is locally stored at the computing device, such as previously downloaded video and/or audio content or content that is captured using a video camera at the computer device. The media content can alternatively be programming content delivered to the computing device 116A, 122, and 124 from the IP network 165.

In one embodiment, the media presentation device 108 can receive descriptive programming information associated with the media content, such as originating website or URL, program title, program date, and/or a brief program description. In another embodiment, the media presentation device 108 can receive video streaming data from the computer device 116A, 122, and 124, such as a brief preview video. In one embodiment, the media content can be descriptive information and/or a video stream associated with a video game operating at computer device 116A and/or gaming console 124.

In one embodiment, the media presentation device 108 can capture information describing status data and/or video that is currently available from a home security device 125. For example, the home security device 125 can capture status information associated with premises under surveillance, such as entry/exit status, alarm status, temperature, video camera data, audio data, and/or equipment status. In one embodiment, the media presentation device 108 can capture URL addressing data from video cameras associated with the home security device 125.

In one embodiment, media presentation device 108 can generate an exemplar for each of the active media sources 106, 116A, 116B, 121, 122, 124, 125, and/or 165 that are coupled to the media presentation device 108. In one embodiment, each exemplar can include all of or a portion of the descriptive information captured from each available media source. In another embodiment, the exemplar can include video content, screen capture content, and/or promotional still images from the available media sources. For example, an exemplar for a programming channel available at a media processor device 106 can include descriptive information identifying the media source as a set-top box, a particular programming channel, and a program title. The exemplar can further include a screen capture from a sample of a video stream that has been captured from the media processor device 106. In another example, the exemplar can include a promotional picture associated with the programming, such as a broadcast network logo or a picture of an actor or broadcast personality associated with the program. In another embodiment, the exemplar can include one or more statistics associated with a game operating at a game console 124 or associated with a home security device 125.

Figure 2:
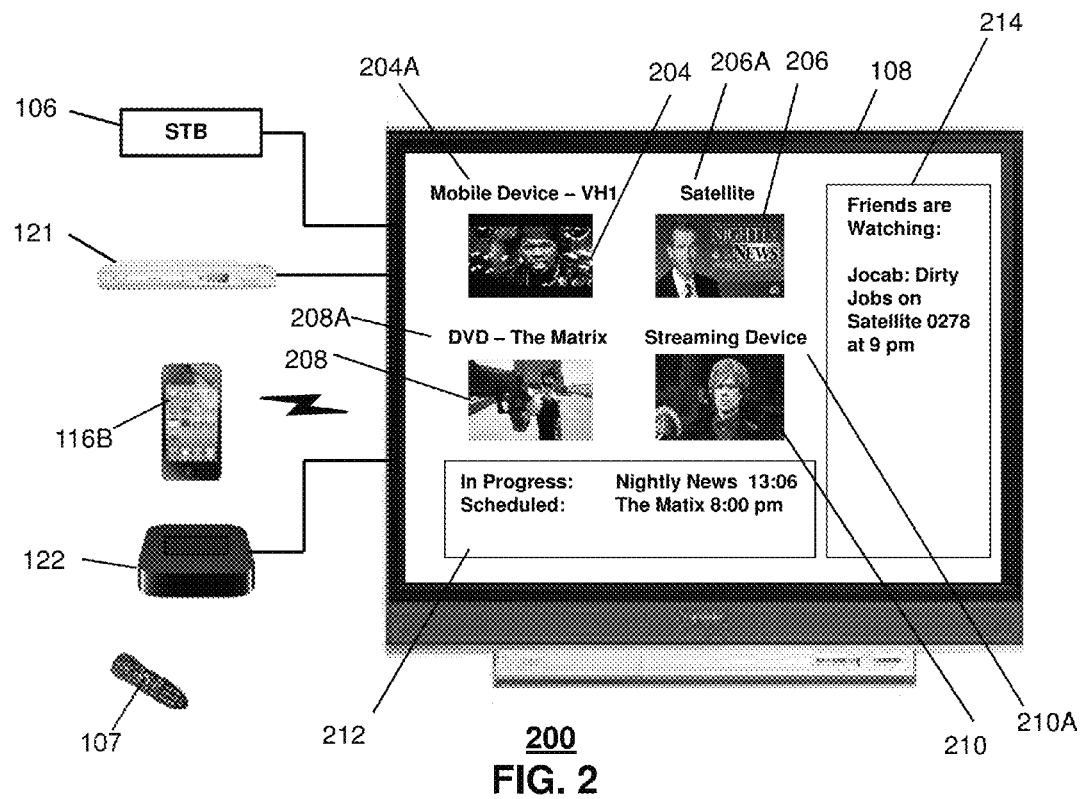
FIG. 2 depicts an illustrative embodiment of a system for previewing and selecting media content at a media presentation device.

In one embodiment, the media presentation device 108 can present a group of generated exemplars at a display via the display module as shown in FIG. 2, where a system 200 for previewing and selecting media content is shown in illustrative embodiment. In one embodiment, the media presentation device 108 can present an arrangement of exemplars 204, 206, 208, and 210 for media sources 106, 121, 116B, and 122 that are captured at the input channels of the media presentation device 108. In one embodiment, the exemplars 204-210 can include screen captures and/or promotional still images associated with the media content that is currently available from each media source 106-122. In another embodiment, each exemplar 204-210 can include a label 204A, 206A, 208A, and 210A including additional descriptive information associated with the media source 204-210 and/or the media content. For example, each exemplar can display an identifier of the media source 204-210, a programming channel title, and/or a title of the available program.

In another embodiment, display module of the media presentation device 108 can present a programming status and information window 212 that includes further information on available programming For example, the programming status and information window 212 can describe which programs are currently in progress, including an elapsed time or a time remaining, and which programs are scheduled for broadcast, including a broadcast time. The programming status and information can be captured from the media sources 204-210. In another embodiment, the display module of the media presentation device 108 can include a friend status window 214. The friend status window can provide information about current and future viewing plans for social networking friends associated with a user of the media presentation device 108. For example, the friend status window 214 can indicate that a friend, Jacob, plans to watch an upcoming program on channel 278 of a satellite system at 278.

In one embodiment, one of the exemplars 204-210 at the media presentation device 108 can be selected using a selector module. For example, a remote controller 107 can be used to select an exemplar 204 from the display. In one embodiment, the remote controller 107 can control both the media presentation device 108 and one or more of the media sources 204-210. For example, the remote controller 107 can control selection media content from an electronic programming guide at a media processor device 106 or by enabling a PLAY function from a digital video recording 121 while similarly controlling volume at the media presentation device 108. In another embodiment, the remote controller 107 can perform commands to adjust presentation volume, to mute or unmute the presentation speakers, and/or to select a picture characteristic such screen resolution or aspect ratio at the media presentation device 108.

In one embodiment, when an exemplar 204 is selected from the group of exemplars 204-210, then a video sample associated with the exemplar 204 is shown. For example, the selection of the exemplar 208 associated with the digital video recorder media source device 121 can cause a video sample of the currently available programming to be displayed. The video sample can be generated by the media presentation device 108 by capturing a sample period of a video data stream from the media source 121. For example, media presentation device 108 can capture the last 15 seconds of video stream data from the media source and present this to the viewer upon selection of the exemplar. In another embodiment, the media presentation device can receive a promotional sequence, such as a preview, of the media content from the media source 121. In another embodiment, the media presentation device 108 can wait for the exemplar 208 to be selected and then capture and present the currently transmitting video content.

In one embodiment, the media presentation device 108 can allow the user to view the entire media content of a selected exemplar 206. In one embodiment, a user can indicate to the media presentation device 108 a desire to view, not just a preview or relevant information, but the entire contents of the media program at the display.

In one embodiment, when an exemplar 206 is selected for display of the entire media content, then the media presentation device 108 signals the associated media source 106 to deliver streaming data for the selected content to the media presentation device 108. In one embodiment, the media presentation device 108 stops presentation of the group of exemplars 204-210 and directs the display module to display the selected media content. In one embodiment, the streaming data from the media source 106 is decoded and converted to video and audio data stream formats. The decoded video stream is presented at the video display while the decoded audio is presented by the audio system.

Figure 3:
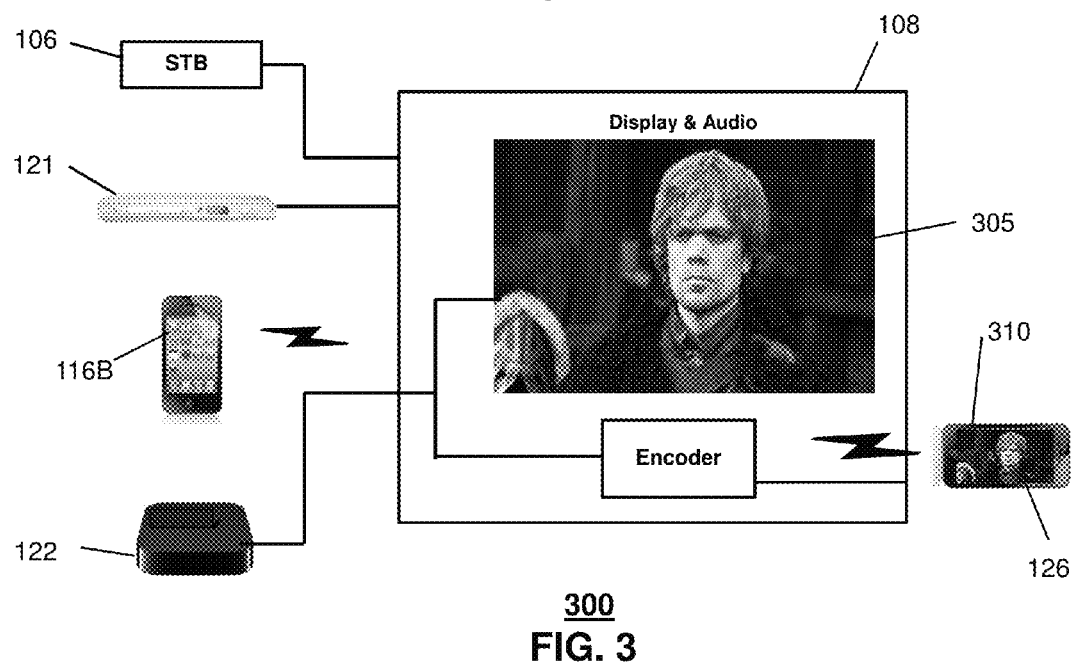
FIG. 3 depicts an illustrative embodiment of a system for receiving a first format of media content from a first media device and delivering a second format of the media content to a second media device using a media presentation device.

FIG. 3 depicts an illustrative embodiment of a system 300 for receiving a first format 305 of media content from a first media device 122 and delivering a second format 310 of the media content to a second media device 310 using a media presentation device. In one embodiment, after the user has selected a particular exemplar 210 associated with available media content at a media source 122, then steaming video data is requested by the media presentation device 108 and received from the media source 122. In one embodiment, the streaming video data received at the media presentation device 108 according to a first format 305, including a first resolution, display aspect ratio, and/or streaming speed. In one embodiment, the media presentation device 108 can be coupled to a receiving media device 126. For example, a wireless mobile communication device 126 can be wirelessly coupled to the media presentation device 108. Alternatively, a television device 128 can be coupled to the media presentation device 108 via, for example, an HDMI link.

In one embodiment, the media presentation device 108 can re-encode the video and audio data that is derived by decoding the input video stream data from the media source 122. An encoder module at the media presentation device 108 can re-encode the media content according to characteristics of the receiving media device 126. In one embodiment, the media presentation device 108 can inquire of the receiving media device 126 to determine characteristics associated with video display and audio reproduction, data link speed, and/or processing speed of the receiving device 126. The encoder module can use these determined characteristics to re-encode the media content to a resolution, aspect ratio, and/or speed that conforms to the capabilities of the receiving device 126. The media presentation device 108 can then transmit the re-encoded media content to the receiving device 126 for reproduction at that device 126.

Figure 4:
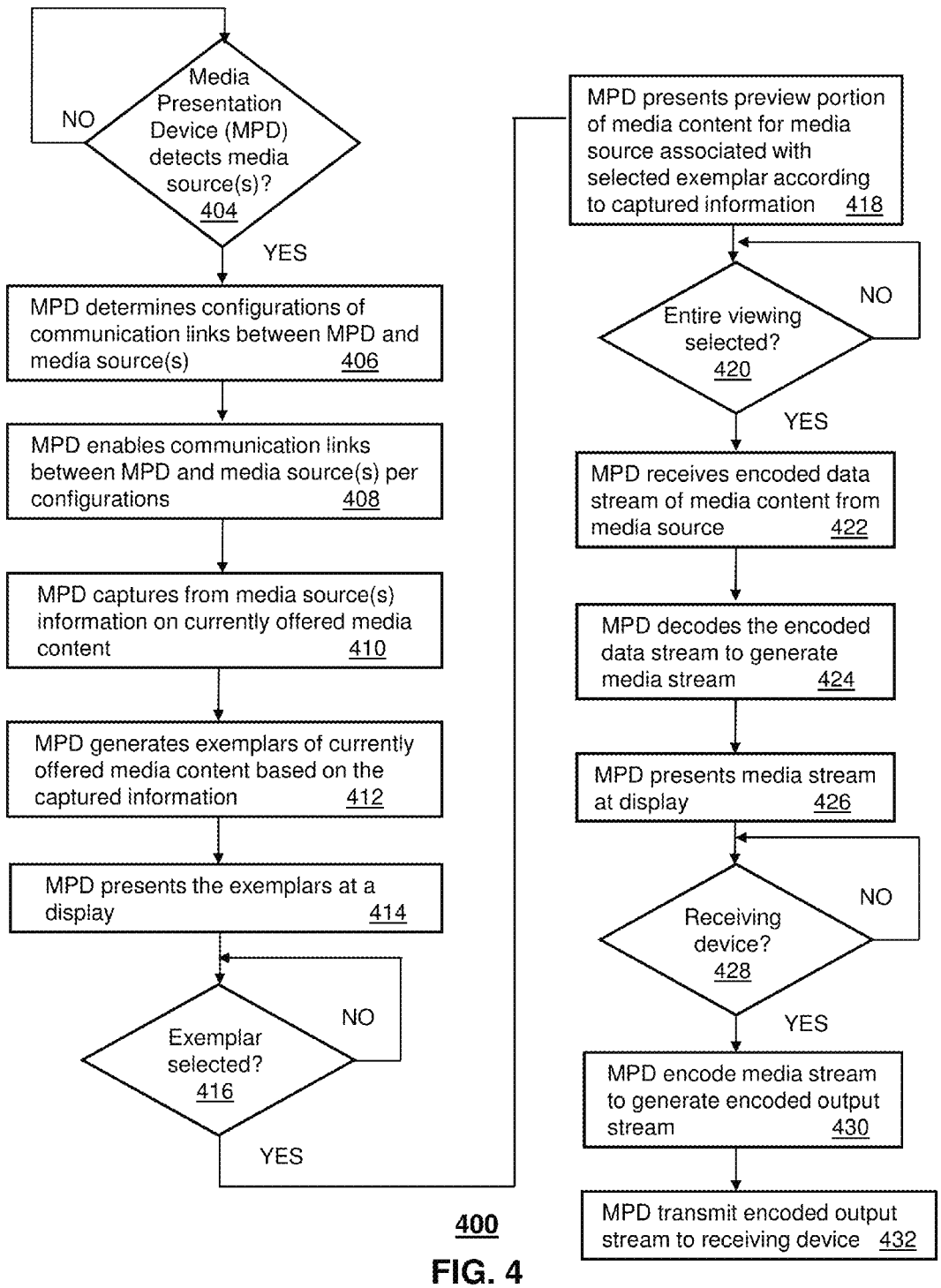
FIG. 4 depicts an illustrative embodiment of a method operating in portions of the system described in FIGS. 1-3 and 5-6.

FIG. 4 depicts an illustrative embodiment of a method operating in portions of the systems and devices described in FIGS. 1-3 and 5-6. Method 400 can begin with step 404, in which the media presentation device 108 scans input channels to the media presentation device 108 to detect media sources 106-125 and 165. In one embodiment, the input capture module can scan several input channels for input signals and can determine which, if any, of the input channels is currently connected to an active media source. For example, the input capture module can include a set of input channels for receiving inputs from several different media sources, such as but not limited to a media processor device 106, a digital video recorder device 121, a computer device 116A, a wireless mobile communication device 116B, a streaming media device 122, a gaming console device 124, and/or a home security system device 125.

If the media presentation device 108 detects media sources 106-125 and 165 at step 404, then, the media presentation device can determine configurations of communication links in step 406 and can enable these communication links in step 408. For example, the input capture module can capture high-definition multimedia interface (HDMI), audio-visual (AV), composite component inputs, separate video (s-video), transmission control protocol/internet protocol (TCP-IP), wireless fidelity (Wi-Fi), wireless display (Wi-Di), wireless Bluetooth, wireless ZigBee, wireless HDMI, and/or digital coaxial cable.

In step 410, the media presentation device 108 can capture information associated with the currently available media content at the active media sources 106-125 and 165. For example, if the media presentation device 108 determines that the media processor device 106 is in an active state, then the input capture module can capture information detailing the current media source conditions at the media processor device 106. For example, if the input capture module can receive data describing the currently-tuned programming channel, currently available recorded program, or currently available streaming video, such as channel number, broadcaster name, program title, program date, brief program description, closed captioning information, web site name, URL, video title, and/or features actors or personalities. In another embodiment, the input capture module can capture a sample of the streaming data. For example, the media presentation device 108 can capture the last 10 seconds of the media content streaming at the currently-tuned channel or can capture a promotional preview of the media content. In another embodiment, the media presentation device 108 information or video data associated with a video game operating at computer device 116A and/or gaming console 124 or associated with a security camera at a home security system 125.

In step 412, the media presentation device 108 can generate a set of exemplars 204-210 based on the capture information from the available media sources 106-125 and 165. In one embodiment, media presentation device 108 can generate an exemplar for each of the active media sources 106-125, and 165 that are coupled to the media presentation device 108. In one embodiment, each exemplar can include all of or a portion of the descriptive information captured from each available media source. In another embodiment, the exemplar can include video content, screen capture content, promotional still images, descriptive information identifying the media source programming channel, and a program title, a promotional picture associated with the programming, such as a broadcast network logo or a picture, and/or one or more statistics associated with a game or home security. In one embodiment, the exemplars 204-210 can include box art descriptive of the media content available at the media sources 106-125 and 165. In another embodiment, the exemplar can include information derived from metadata associated with the media content at the media source. For example, a media source can provide a media stream of the media content, where the media stream includes metadata that is encoded into the stream. The metadata can describe any of various aspects of the media content, including such characteristics as title, actors, director, production company, plot summary, and the like.

In step 414, the media presentation device 108 can present the set of exemplars 204-210 at a display. In one embodiment, the media presentation device 108 can present an arrangement of exemplars 204-210 for the available media sources 106-125 and 165 that are captured at the input channels of the media presentation device 108. In one embodiment, the exemplars 204-210 can include images. In another embodiment, the exemplars 204-210 include labels with additional descriptive information. If one of the exemplars 204-210 is selected, in step 416, then in step 418 the media presentation device 108 presents a preview of the media content for the media source 106-125 and 165 associated with the exemplar based on the captured information. In one embodiment, a video sample associated with the exemplar is shown. The video sample can be generated by the media presentation device 108 by capturing a sample period of a video data stream from the media source 121, by receiving a promotional sequence, or by presenting the currently transmitting video content. In one embodiment, the media presentation device 108 can access a search characteristic associated with the plurality of media content. The exemplars can be generated based on the search characteristic. For example, the media presentation device 108 can search for media content at the media sources 106-125 and 165 that are connected to the device 108. Where a characteristic of media content, such as title of a program or an actor in the media content, meets the requirements of the search term, the media presentation device 108 can generate an exemplar for that media source and content. In another embodiment, the search characteristic can be stored at a user profile associated with the device.

If, in step 420, the media presentation device 108 determines that the user desires to view the entire media content program, then in step 422 the media presentation device receive an encoded data stream from the media source 106-125 and 165 associated with the selected exemplar 204-210. In one embodiment, when an exemplar 206 is selected for display of the entire media content, then the media presentation device 108 signals the associated media source 106 to deliver streaming data for the selected content to the media presentation device 108. In one embodiment, the media presentation device 108 stops presentation of the group of exemplars 204-210 and directs the display module to display the selected media content.

In step 424, the media presentation device 108 decodes the encoded data stream to generate a media content stream for presentation at the display in step 426. If the media presentation device 108 detects a receiving device 126 in step 428, then, in step 430, the media presentation device 108 can generate an encoded output stream for the receiving device 126. In one embodiment, the media presentation device 108 can inquire of the receiving media device 126 to determine characteristics associated with video display and audio reproduction, data link speed, and/or processing speed of the receiving device 126. The encoder module can use these determined characteristics to re-encode the media content to a resolution, aspect ratio, and/or speed that conforms to the capabilities of the receiving device 126. In step 432, the media presentation device 108 can transmit the encoded output stream to the receiving device 126 in step 432.

Upon reviewing the aforementioned embodiments, it would be evident to an artisan with ordinary skill in the art that said embodiments can be modified, reduced, or enhanced without departing from the scope and spirit of the claims described below. For example, in one embodiment, the media presentation device can present a selected exemplar 208 within the exemplar window, such that the sample video is displayed while retaining display of the other exemplars 204, 206, and 210. In another embodiment, the sample media contents are displayed at a full size window such that the other exemplars 204, 206, and 210 are partially or totally obscured. In another embodiment, selection of an exemplar 206 causes the media presentation device 108 to display additional information associated with the available media content. For example, a title, featured actors or personalities, a brief description, air date, and/or closed-captioning information can be displayed. The additional information can be displayed as part of a pop-up window or can be displayed using the entire display area.

In another embodiment, the media presentation device 108 can receive information associated with the viewing plans of social network friends from the computing devices 175 at the IP network 165. For example, a friend at a social network can input viewing information into an on-line social network site. This viewing information can be accessed by the media presentation device 108 by linking to a specified URL location at the IP network 165. In another embodiment, information associated with programming selections at the media presentation device can be transmitted to the IP network 165 for inclusion at a social network program.

In another embodiment, when an exemplar 206 is selected, a first selection box can be displayed asking if the user wants to see information, a preview, or the entire contents. If the user selects to see the entire media contents, then the media presentation device 108 can begin displaying the entire contents at the display. In another embodiment, a second selection box can be displayed after the user has viewed a preview of the media content by selecting an exemplar 206. The user can cause the media presentation device 108 to transition from presentation of a video sample to presentation of the entire content.

Figure 5:
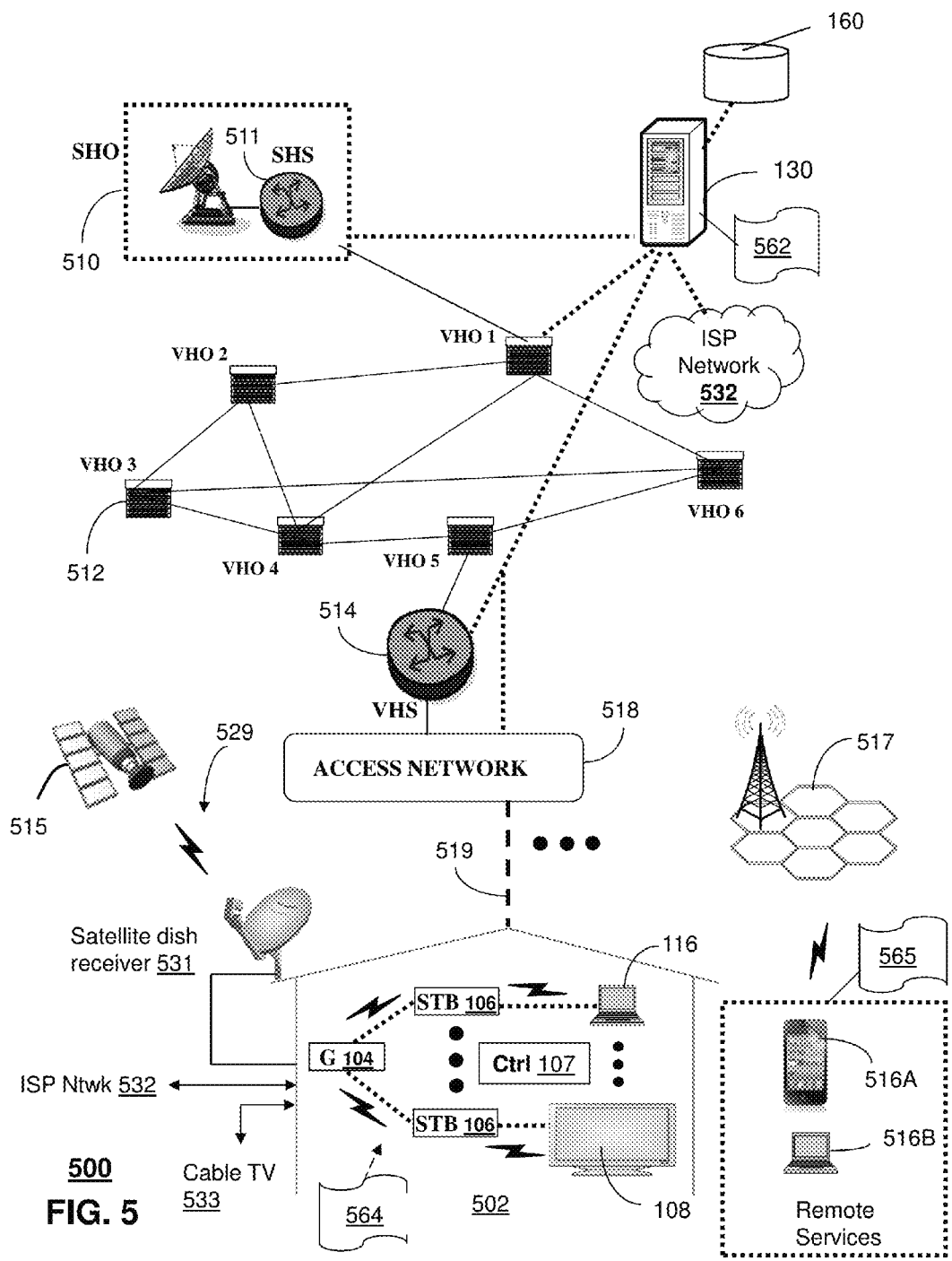
FIGS. 5-6 depict illustrative embodiments of communication systems that provide media content.

FIG. 5 depicts an illustrative embodiment of a first communication system 500 for delivering media content. The communication system 500 can represent an Internet Protocol Television (IPTV) media system that can be used for delivering media content in the systems 100 of FIG. 1. The communication system 500 can be utilized to provide media content to a wireless media processor device 106 for presentation by a media presentation device 108 by means of media server 130. In one embodiment, the system 100 can be a subscription content service. The media content can be any type of viewable content, such as broadcast television, cable or premium television, video on demand, or pay-per-per view television. In one embodiment, the system 100 can include one or more media servers 130 that can receive media content from one or more media content sources 160. The media servers 130 can deliver media content through the IPTV network 500 to the wireless media processor device 106. The wireless media processor device 106 can provide the delivered media content to one or more media presentation devices 108.

The IPTV media system 500 can include a super head-end office (SHO) 510 with at least one super headend office server (SHS) 511 which receives media content from satellite and/or terrestrial communication systems. In the present context, media content can represent, for example, audio content, moving image content such as 2D or 3D videos, video games, virtual reality content, still image content, and combinations thereof. The SHS server 511 can forward packets associated with the media content to one or more video head-end servers (VHS) 514 via a network of video head-end offices (VHO) 512 according to a multicast communication protocol.

The VHS 514 can distribute multimedia broadcast content via an access network 516 to commercial and/or residential buildings 502 housing a gateway 104 (such as a residential or commercial gateway). The access network 516 can represent a group of digital subscriber line access multiplexers (DSLAMs) located in a central office or a service area interface that provide broadband services over fiber optical links or copper twisted pairs 519 to buildings 502. The gateway 104 can use communication technology to distribute broadcast signals to media processors 106 such as Set-Top Boxes (STBs) which in turn present broadcast channels to media devices such as computers or television sets managed in some instances by a media controller 107 (such as an infrared or RF remote controller).

The gateway 104, the media processors 106, and media presentation devices 108 can utilize tethered communication technologies (such as coaxial, powerline or phone line wiring) or can operate over a wireless access protocol such as Wireless Fidelity (Wi-Fi), Bluetooth, Zigbee, or other present or next generation local or personal area wireless network technologies. By way of these interfaces, unicast communications can also be invoked between the media processors 106 and subsystems of the IPTV media system for services such as video-on-demand (VoD), browsing an electronic programming guide (EPG), or other infrastructure services.

A satellite broadcast television system 529 can be used in the media system of FIG. 5. The satellite broadcast television system can be overlaid, operably coupled with, or replace the IPTV system as another representative embodiment of communication system 500. In this embodiment, signals transmitted by a satellite 515 that include media content can be received by a satellite dish receiver 531 coupled to the building 502. Modulated signals received by the satellite dish receiver 531 can be transferred to the media processors 106 for demodulating, decoding, encoding, and/or distributing broadcast channels to the media display devices 108. The media processors 106 can be equipped with a broadband port to an Internet Service Provider (ISP) network 532 to enable interactive services such as VoD and EPG as described above.

In yet another embodiment, an analog or digital cable broadcast distribution system such as cable TV system 533 can be overlaid, operably coupled with, or replace the IPTV system and/or the satellite TV system as another representative embodiment of communication system 500. In this embodiment, the cable TV system 533 can also provide Internet, telephony, and interactive media services. The subject disclosure can apply to other present or next generation over-the-air and/or landline media content services system.

Some of the network elements of the IPTV media system can be coupled to one or more computing devices 130, a portion of which can operate as a web server for providing web portal services over the ISP network 532 to wireline media devices 506 or wireless communication devices 116.

Communication system 500 can also provide for all or a portion of the computing devices 130 to function as a media server 130. The media server 130 can use computing and communication technology to perform function 562, which can include among other things, providing media content to one or more media processor devices 106. The media processors 106 and mobile communication devices 116A and 116B can be provisioned with software functions 564 and 565, respectively, to utilize the services of media server 130.

Multiple forms of media services can be offered to media devices over landline technologies such as those described above. Additionally, media services can be offered to media devices by way of a wireless access base station 117 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 6:
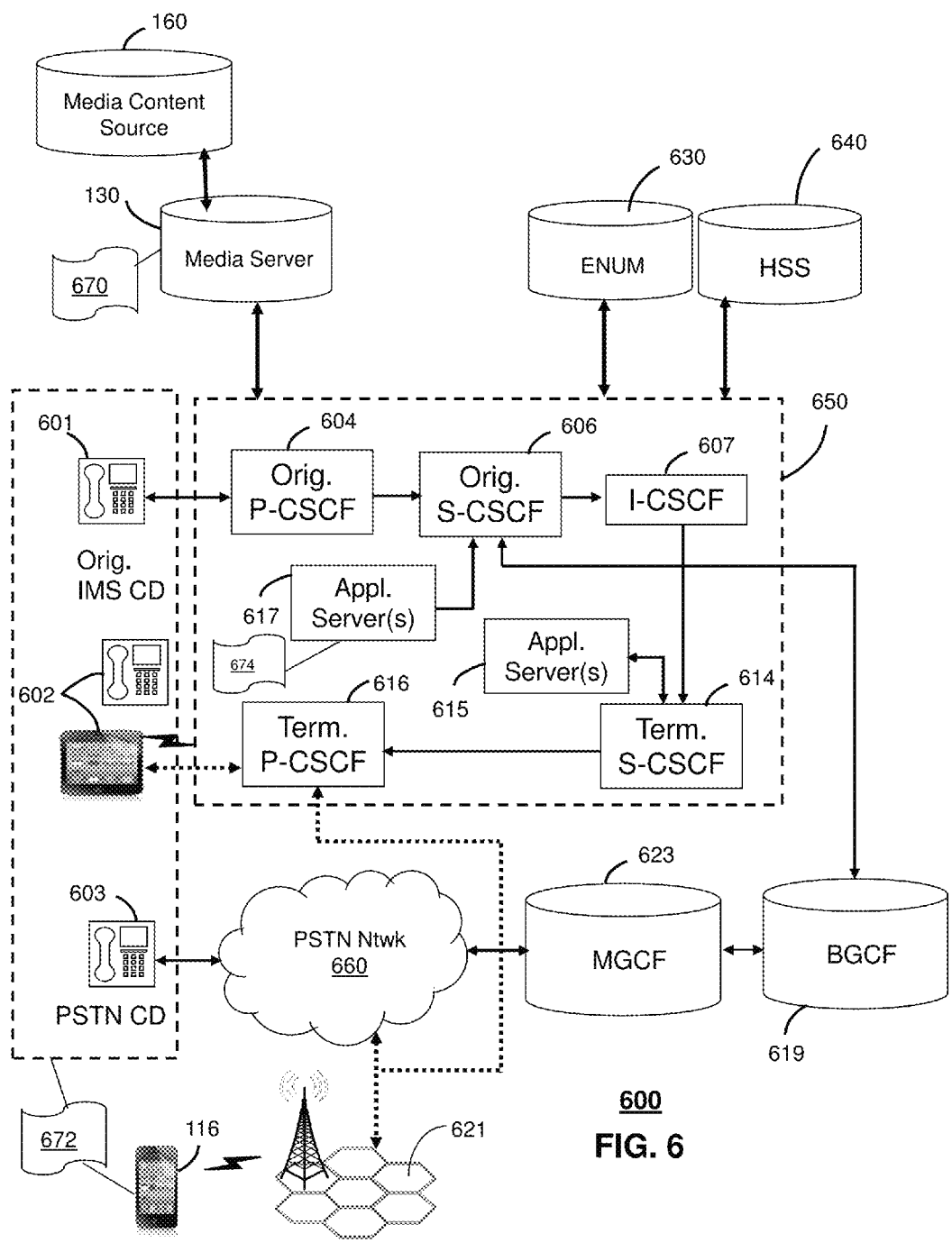

FIG. 6 depicts an illustrative embodiment of a communication system 600 employing IP Multimedia Subsystem (IMS) network architecture to facilitate the combined services of circuit-switched and packet-switched systems. The communication system 600 can represent an IMS media system that can be used for delivering media content and telephony services in the system 100 of FIG. 1. Communication system 600 can also be overlaid or operably coupled with communication system 600 as another representative embodiment of communication system 600. The communication system 600 can be utilized to provide media content by a media server 130 and bi-directional telecommunication to communication devices (CD) 601-5. The communication system 600 can also be utilized to provide media content by a media server 130 to a wireless media processor device 106.

Communication system 600 can comprise a Home Subscriber Server (HSS) 640, a tElephone NUmber Mapping (ENUM) server 630, and other network elements of an IMS network 650. The IMS network 650 can establish communications between IMS-compliant communication devices (CDs) 601, 602, Public Switched Telephone Network (PSTN) CDs 603, 605, and combinations thereof by way of a Media Gateway Control Function (MGCF) 623 coupled to a PSTN network 660. The MGCF 623 need not be used when a communication session involves IMS CD to IMS CD communications. A communication session involving at least one PSTN CD may utilize the MGCF 623.

IMS CDs 601, 602 can register with the IMS network 650 by contacting a Proxy Call Session Control Function (P-CSCF) which communicates with an interrogating CSCF (I-CSCF), which in turn, communicates with a Serving CSCF (S-CSCF) to register the CDs with the HSS 640. To initiate a communication session between CDs, an originating IMS CD 601 can submit a Session Initiation Protocol (SIP INVITE) message to an originating P-CSCF 604 which communicates with a corresponding originating S-CSCF 606. The originating S-CSCF 606 can submit the SIP INVITE message to one or more application servers (ASs) 617 that can provide a variety of services to IMS subscribers.

For example, the application servers 617 can be used to perform originating call feature treatment functions on the calling party number received by the originating S-CSCF 606 in the SIP INVITE message. Originating treatment functions can include determining whether the calling party number has international calling services, call ID blocking, calling name blocking, 5-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 606 can submit queries to the ENUM system 630 to translate an E.164 telephone number in the SIP INVITE message to a SIP Uniform Resource Identifier (URI) if the terminating communication device is IMS-compliant. The SIP URI can be used by an Interrogating CSCF (I-CSCF) 607 to submit a query to the HSS 640 to identify a terminating S-CSCF 614 associated with a terminating IMS CD such as reference 602. Once identified, the I-CSCF 607 can submit the SIP INVITE message to the terminating S-CSCF 614. The terminating S-CSCF 614 can then identify a terminating P-CSCF 616 associated with the terminating CD 602. The P-CSCF 616 may then signal the CD 602 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 6 may be interchangeable. It is further noted that communication system 600 can be adapted to support video conferencing. In addition, communication system 600 can be adapted to provide the IMS CDs 601, 602 with the multimedia and Internet services of communication system 600 of FIG. 6.

If the terminating communication device is instead a PSTN CD such as CD 603 or CD 605 (in instances where the cellular phone only supports circuit-switched voice communications), the ENUM system 630 can respond with an unsuccessful address resolution which can cause the originating S-CSCF 606 to forward the call to the MGCF 623 via a Breakout Gateway Control Function (BGCF) 619. The MGCF 623 can then initiate the call to the terminating PSTN CD over the PSTN network 660 to enable the calling and called parties to engage in voice and/or data communications.

It is further appreciated that the CDs of FIG. 6 can operate as wireline or wireless devices. For example, the CDs of FIG. 6 can be communicatively coupled to a cellular base station 621, a femtocell, a Wi-Fi router, a Digital Enhanced Cordless Telecommunications (DECT) base unit, or another suitable wireless access unit to establish communications with the IMS network 650 of FIG. 6. The cellular access base station 621 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 6.

Cellular phones supporting LTE can support packet-switched voice and packet-switched data communications and thus may operate as IMS-compliant mobile devices. In this embodiment, the cellular base station 621 may communicate directly with the IMS network 650 as shown by the arrow connecting the cellular base station 621 and the P-CSCF 616.

It is further understood that alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

Media server 130 can perform function 670 and thereby provide media services to the CDs 601, 602, 603 and 605 of FIG. 6. CDs 601, 602, 603 and 605, which can be adapted with software 672 to perform function 674 to utilize the services of the media server 130. The media server 130 can be an integral part of the application server(s) 617 performing function 670, which can be substantially similar to function 562 and adapted to the operations of the IMS network 650.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as Third Generation Partnership Project (3GPP). It is further noted that some or all embodiments of the subject disclosure may in whole or in part modify, supplement, or otherwise supersede final or proposed standards published and promulgated by 3GPP.

Figure 7:
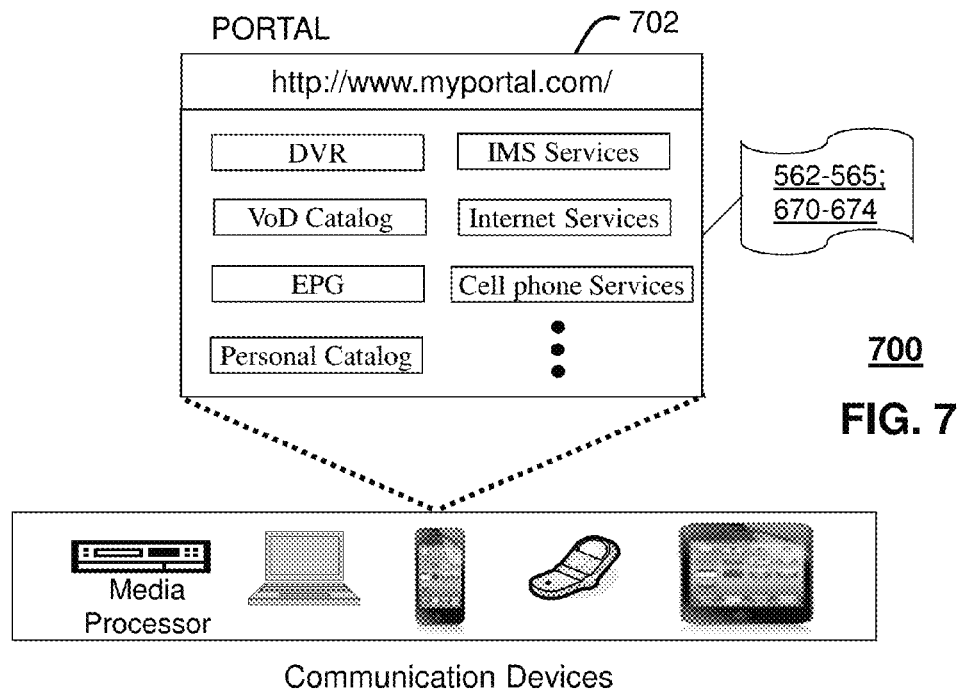
FIG. 7 depicts an illustrative embodiment of a web portal for interacting with the communication systems of FIGS. 1-2 and 5-6.

FIG. 7 depicts an illustrative embodiment of a web portal 702 which can be hosted by server applications operating from the computing devices 130 of the communication system 500 illustrated in FIG. 5. The communication system 500 can be utilized to provide media content to a wireless media processor device 106 for presentation by a media presentation device 108. The web portal system 700 can be used to register and maintain subscriber location and contact information and to configure alerts.

The web portal 702 can be used for managing services of communication systems 500-600. A web page of the web portal 702 can be accessed by a Uniform Resource Locator (URL) with an Internet browser such as Microsoft's Internet Explorer™, Mozilla's Firefox™, Apple's Safari™, or Google's Chrome™ using an Internet-capable communication device such as those described in FIGS. 1-2. The web portal 702 can be configured, for example, to access a media processor 106 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 106. The web portal 702 can also be used for provisioning IMS services described earlier, provisioning Internet services, provisioning cellular phone services, and so on.

The web portal 702 can further be utilized to manage and provision software applications 562-565, and 670-674 to adapt these applications as may be desired by subscribers and service providers of communication systems 500-600.

Figure 8:
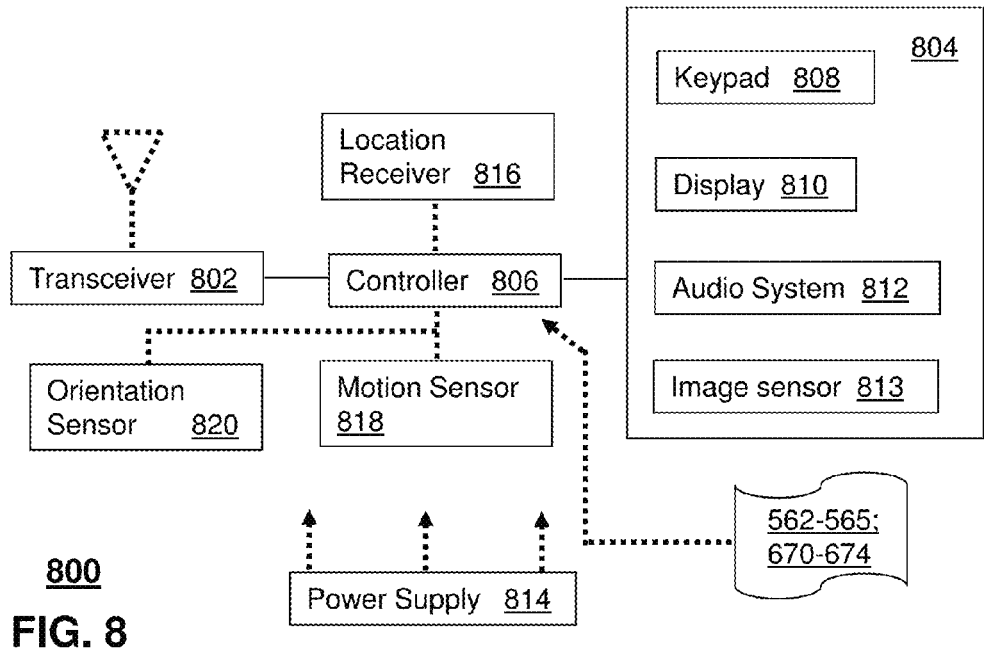
FIG. 8 depicts an illustrative embodiment of a communication device.

FIG. 8 depicts an illustrative embodiment of a communication device 800. Communication device 800 can serve in whole or in part as an illustrative embodiment of the devices depicted or otherwise described in FIGS. 1-7. The communication device 800 can be utilized to receive emergency alert notifications, messages, and/or video streams for display at a wireless media processor device 106; a media presentation device 108, and/or a mobile communication device 116.

The communication device 800 can perform an operation associated with the presentation of the emergency alert information at a display according to the first action of the first viewer. The communication device 800 can comprise a wireline and/or wireless transceiver 802 (herein transceiver 802), a user interface (UI) 804, a power supply 814, a location receiver 816, a motion sensor 816, an orientation sensor 820, and a controller 806 for managing operations thereof. The transceiver 802 can support short-range or long-range wireless access technologies such as Bluetooth, ZigBee, Wi-Fi, DECT, or cellular communication technologies, just to mention a few. Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 802 can also be adapted to support circuit-switched wireline access technologies (such as PSTN), packet-switched wireline access technologies (such as TCP/IP, VoIP, etc.), and combinations thereof.

The UI 804 can include a depressible or touch-sensitive keypad 806 with a navigation mechanism such as a roller ball, a joystick, a mouse, or a navigation disk for manipulating operations of the communication device 800. The keypad 806 can be an integral part of a housing assembly of the communication device 800 or an independent device operably coupled thereto by a tethered wireline interface (such as a USB cable) or a wireless interface supporting for example Bluetooth. The keypad 806 can represent a numeric keypad commonly used by phones, and/or a QWERTY keypad with alphanumeric keys. The UI 804 can further include a display 810 such as monochrome or color LCD (Liquid Crystal Display), OLED (Organic Light Emitting Diode) or other suitable display technology for conveying images to an end user of the communication device 800. In an embodiment where the display 810 is touch-sensitive, a portion or all of the keypad 806 can be presented by way of the display 810 with navigation features.

The display 810 can use touch screen technology to also serve as a user interface for detecting user input. As a touch screen display, the communication device 800 can be adapted to present a user interface with graphical user interface (GUI) elements that can be selected by a user with a touch of a finger. The touch screen display 810 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 810 can be an integral part of the housing assembly of the communication device 800 or an independent device communicatively coupled thereto by a tethered wireline interface (such as a cable) or a wireless interface.

The UI 804 can also include an audio system 812 that utilizes audio technology for conveying low volume audio (such as audio heard in proximity of a human ear) and high volume audio (such as speakerphone for hands free operation). The audio system 812 can further include a microphone for receiving audible signals of an end user. The audio system 812 can also be used for voice recognition applications. The UI 804 can further include an image sensor 813 such as a charged coupled device (CCD) camera for capturing still or moving images.

The power supply 814 can utilize common power management technologies such as replaceable and rechargeable batteries, supply regulation technologies, and/or charging system technologies for supplying energy to the components of the communication device 800 to facilitate long-range or short-range portable applications. Alternatively, or in combination, the charging system can utilize external power sources such as DC power supplied over a physical interface such as a USB port or other suitable tethering technologies.

The location receiver 816 can utilize location technology such as a global positioning system (GPS) receiver capable of assisted GPS for identifying a location of the communication device 800 based on signals generated by a constellation of GPS satellites, which can be used for facilitating location services such as navigation. The motion sensor 816 can utilize motion sensing technology such as an accelerometer, a gyroscope, or other suitable motion sensing technology to detect motion of the communication device 800 in three-dimensional space. The orientation sensor 820 can utilize orientation sensing technology such as a magnetometer to detect the orientation of the communication device 800 (north, south, west, and east, as well as combined orientations in degrees, minutes, or other suitable orientation metrics).

The communication device 800 can use the transceiver 802 to also determine a proximity to a cellular, Wi-Fi, Bluetooth, or other wireless access points by sensing techniques such as utilizing a received signal strength indicator (RSSI) and/or signal time of arrival (TOA) or time of flight (TOF) measurements. The controller 806 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 800.

Other components not shown in FIG. 8 can be used in one or more embodiments of the subject disclosure. For instance, the communication device 800 can include a reset button (not shown). The reset button can be used to reset the controller 806 of the communication device 800. In yet another embodiment, the communication device 800 can also include a factory default setting button positioned, for example, below a small hole in a housing assembly of the communication device 800 to force the communication device 800 to re-establish factory settings. In this embodiment, a user can use a protruding object such as a pen or paper clip tip to reach into the hole and depress the default setting button. The communication device 800 can also include a slot for adding or removing an identity module such as a Subscriber Identity Module (SIM) card. SIM cards can be used for identifying subscriber services, executing programs, storing subscriber data, and so forth.

The communication device 800 as described herein can operate with more or less of the circuit components shown in FIG. 8. These variant embodiments can be used in one or more embodiments of the subject disclosure.

The communication device 800 can be adapted to perform the functions of the wireless media processor device 106, the media presentation device 108, and/or the mobile communication devices 116 of FIG. 5, as well as the IMS CDs 601-602 and PSTN CDs 603-605 of FIG. 6. It will be appreciated that the communication device 800 can also represent other devices that can operate in communication systems 500-600 of FIGS. 5-6 such as a gaming console and a media player.

The communication device 800 shown in FIG. 8 or portions thereof can serve as a representation of one or more of the devices of communication systems 500-600. In addition, the controller 806 can be adapted in various embodiments to perform the functions 562-565 and 670-674, respectively.

In one or more embodiments, the wireless set top box can request and obtain remote access to multiple home media processor subscriber accounts where the accounts may or may not be related. In this example, the wireless set top box can present media content or present other communication services (e.g., voice, video and/or data) associated with the multiple subscriber accounts at multiple display devices and/or at the same display device (e.g., multiple windows on a screen or picture-in-picture presentation. In one or more embodiments, the wireless set top box is a multi-mode communication device capable of engaging simultaneously in multiple communication sessions that utilize different wireless protocols.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 9:
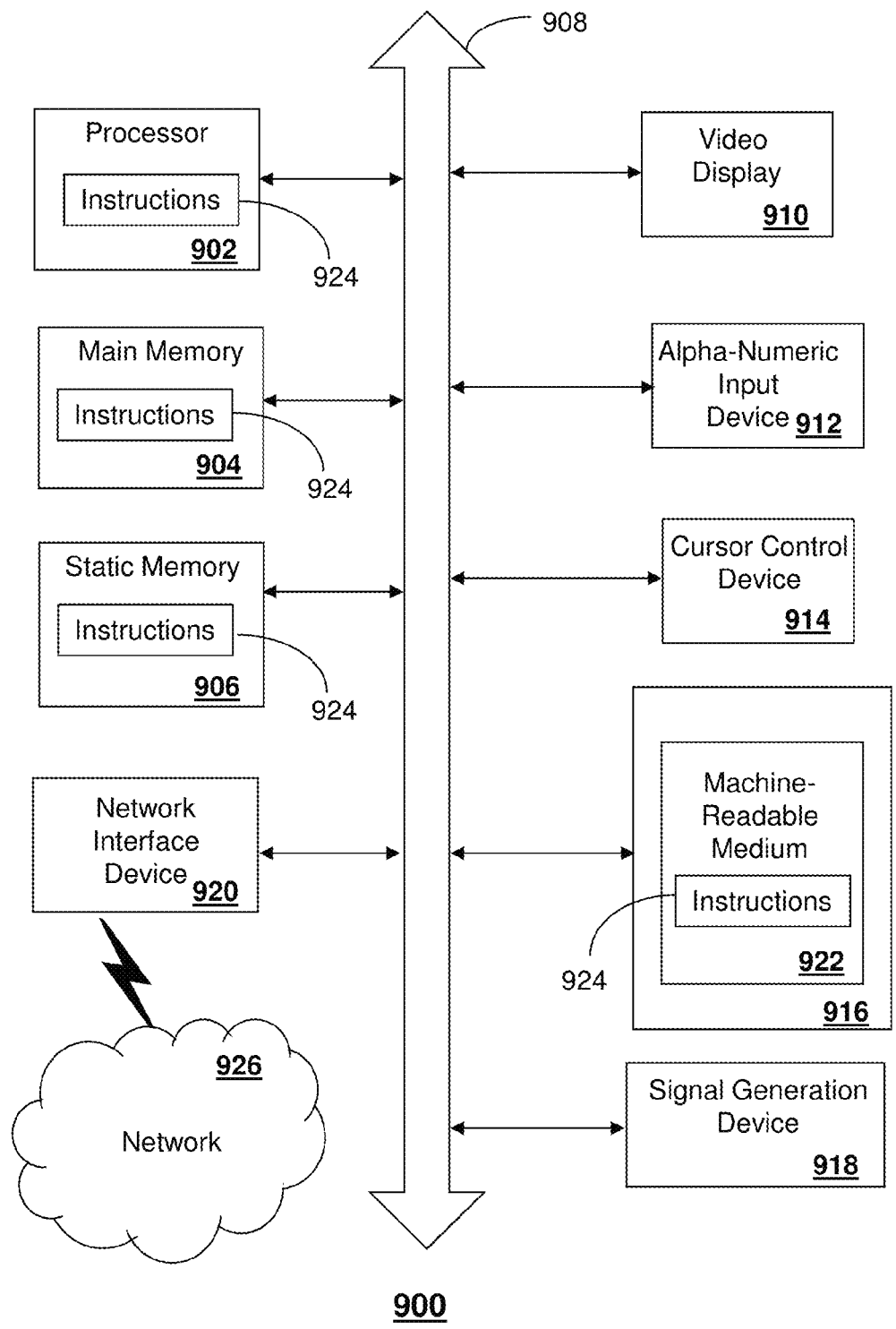
FIG. 9 is a diagrammatic representation of a machine in the form of a computer system within which a set of instructions, when executed, may cause the machine to perform any one or more of the methods described herein.

FIG. 9 depicts an exemplary diagrammatic representation of a machine in the form of a computer system 900 within which a set of instructions, when executed, may cause the machine to perform any one or more of the methods describe above. For example, the wireless media processor device 106, the media server device 130, the media presentation device 108, and/or the gateway device 104, and/or the mobile communication device 116 can comprise a machine in the form of a computer system 900. In some embodiments, the machine may be connected (e.g., using a network 926) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 900 may include a processor (or controller) 902 (e.g., a central processing unit (CPU), a graphics processing unit (GPU, or both), a main memory 904 and a static memory 906, which communicate with each other via a bus 906. The computer system 900 may further include a display unit 910 (e.g., a liquid crystal display (LCD), a flat panel, or a solid state display. The computer system 900 may include an input device 912 (e.g., a keyboard), a cursor control device 914 (e.g., a mouse), a disk drive unit 916, a signal generation device 916 (e.g., a speaker or remote control) and a network interface device 920. In distributed environments, the embodiments described in the subject disclosure can be adapted to utilize multiple display units 910 controlled by two or more computer systems 900. In this configuration, presentations described by the subject disclosure may in part be shown in a first of the display units 910, while the remaining portion is presented in a second of the display units 910.

The disk drive unit 916 may include a tangible computer-readable storage medium 922 on which is stored one or more sets of instructions (e.g., software 924) embodying any one or more of the methods or functions described herein, including those methods illustrated above. The instructions 924 may also reside, completely or at least partially, within the main memory 904, the static memory 906, and/or within the processor 902 during execution thereof by the computer system 900. The main memory 904 and the processor 902 also may constitute tangible computer-readable storage media.

Dedicated hardware implementations including, but not limited to, application specific integrated circuits, programmable logic arrays and other hardware devices that can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable array. Furthermore, software implementations (e.g., software programs, instructions, etc.) can include, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 922 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth, Wi-Fi, Zigbee), and long-range communications (e.g., WiMAX, GSM, CDMA, LTE) can be used by computer system 900.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, can be used in the subject disclosure, including combinations of components and/or steps from the embodiments and/or methods described herein.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A device, comprising: a display; a processing system including a processor; and a memory that stores executable instructions that, when executed by the processing system, facilitate performance of operations, comprising: scanning a plurality of inputs to detect a plurality of media sources that are communicatively coupled; accessing a search term associated with a user profile for a user of the device, wherein the search term comprises one of a title of or an individual appearing in video content; comparing the search term to media content information from the plurality of media sources; identifying first video content of a first media source of the plurality of media sources, wherein the search term matches a first portion of first media content information that is associated with the first video content; determining first configuration information for the first media source according to signals from the first media source; configuring a first communication link of the first media source according to the first configuration information; capturing a first media data stream associated with the first video content from the first media source of the plurality of media sources and a second media data stream from a second media source of the plurality of media sources; generating a first exemplar for the first media source according to the first video content of the first media data stream and a second exemplar for the second media source according to second video content of the second media data stream; transmitting the first exemplar and the second exemplar to a first media device for presentation at the first media device; presenting the first exemplar and the second exemplar at the display; receiving a selection of the first exemplar; presenting first information associated with first media content in a pop-up window at the display responsive to the selection of the first exemplar; presenting a preview portion of the first media content responsive to the selection of the first exemplar, wherein the preview portion of the first media content is based on the first media data stream; receiving a first encoded data stream representing the first media content of the first media source responsive to the selection of the first exemplar; decoding the first encoded data stream to generate a first presentation stream of the first media content; presenting the first presentation stream at the display; presenting second information associated viewing activities of members of a social network associated with the device in a status window of the display; sending a request for a characteristic to a communication device; receiving the characteristic from the communication device; re-encoding the first presentation stream to generate an output presentation stream according to the characteristic of the communication device that is coupled to the device; and transmitting the output presentation stream to the communication device.

2. The device of claim 1, wherein the first exemplar comprises box art associated with the first media content.

3. The device of claim 1, wherein the first exemplar further comprises a screen capture associated with the first media content.

4. The device of claim 1, wherein the characteristic is associated with video reproduction, audio reproduction, data link speed, processing speed, or any combination thereof, of the communication device.

5. The device of claim 1, wherein the first exemplar comprises third information describing a program being received by a set-top box device from a service provider.

6. The device of claim 1, wherein the operations further comprise: capturing a second media stream from a home security system that is coupled to the device; generating a home security exemplar according to the second media stream that is captured; and presenting the home security exemplar at the display of the device.

7. The device of claim 1, wherein the operations further comprise capturing, from the communication device, third information associated with the characteristic.

8. The device of claim 1, wherein the first media device comprises one of the plurality of media sources and wherein the first exemplar is selected via the first media device.

9. The device of claim 1, wherein the operations further comprise: receiving fourth information associated with the plurality of media sources; and parsing the fourth information to detect first metadata for the first video content of the first media source.

10. The device of claim 1, wherein the operations further comprise transmitting fifth information associated with the first media content over a network.

11. The device of claim 1, wherein the device comprises a television.

12. The device of claim 1, wherein one of the plurality of media sources comprises a set-top box device for receiving programming from a service provider.

13. The device of claim 1, wherein the operations further comprise accessing, at the user profile associated with the user of the device, the search term.

14. A non-transitory machine-readable storage medium, comprising executable instructions that, when executed by a processing system including processor, facilitate performance of operations comprising: determining a plurality of first configurations according to signals of a plurality of media sources that are communicatively coupled to a television device, wherein one of the plurality of media sources comprises a set-top box device for receiving programming from a service provider; enabling a plurality of communication links between the plurality of media sources and the processing system according to the plurality of first configurations; capturing, from the plurality of media sources that are communicatively coupled to the television device, first information that is descriptive of a plurality of media content that is offered at the plurality of media sources; accessing a search term associated with a user profile for a user of the television device, wherein the search term comprises one of a title of or an individual appearing in video content; comparing the search term to the first information that is descriptive of the plurality of media content; identifying first video content of a first media source of the plurality of media sources, wherein the search term matches a first portion of the first information that is associated with the first video content; capturing a first media data stream from the first media source of the plurality of media sources; generating a plurality of exemplars of the plurality of media content offered at the plurality of media sources based on the first information captured from the plurality of media sources, wherein a first exemplar of the plurality of exemplars is generated according to first media data stream; presenting the plurality of exemplars at a display of the television device; receiving a selection of the first exemplar of the plurality of exemplars; presenting second information associated with first media content in a pop-up window at the display responsive to the selection of the first exemplar; presenting third information associated viewing activities of members of a social network associated with the processing system in a status window of the display; sending a request for a presentation characteristic to a media device; receiving the presentation characteristic from the media device; encoding a first media stream of the first media content of the first media source of the plurality of media sources associated with the first exemplar according to the presentation characteristic of the media device that is communicatively coupled to the processing system; and transmitting the first media stream to the media device for presentation at the media device.

15. The non-transitory machine-readable storage medium of claim 14, wherein the operations further comprise: capturing a second media stream from a home security system that is coupled to the television device; generating a home security exemplar according to the second media stream that is captured; and presenting the home security exemplar at the display of the television device.

16. The non-transitory machine-readable storage medium of claim 14, wherein the presentation characteristic is associated with video reproduction, audio reproduction, data link speed, processing speed, or any combination thereof, of the media device.

17. The non-transitory machine-readable storage medium of claim 14, wherein one of the plurality of exemplars comprises fourth information describing a program being received by the set-top box device from the service provider.

18. A method, comprising: determining, by a processing system including a processor, a plurality of configuration information for a plurality of media sources; configuring, by the processing system, a plurality of communication links between the plurality of media sources and the processing system according to the plurality of configuration information; capturing, by the processing system, first information from the plurality of media sources describing a plurality of media content offered at the plurality of media sources; accessing, by the processing system, a search term associated with a user profile for a user of the processing system, wherein the search term comprises one of a title of or an individual appearing in video content; comparing, by the processing system, the search term to the first information from the plurality of media sources; identifying, by the processing system, first media content of a first media source of the plurality of media sources, wherein the search term matches a first portion of the first information that is associated with the first media content; generating, by the processing system, a plurality of exemplars of the plurality of media content offered at the plurality of media sources based on the first information captured from the plurality of media sources, wherein a first exemplar of the plurality of exemplars comprises a screen capture from a first data stream that is associated with the first media content, wherein one of the plurality of exemplars comprises fourth information describing a program being received by a set-top box device from a service provider; presenting, by the processing system, the plurality of exemplars at a display; receiving, by the processing system, a selection of the first exemplar of the plurality of exemplars; presenting, by the processing system, second information associated with the first media content in a pop-up window at the display responsive to the selection of the first exemplar; presenting, by the processing system, third information associated viewing activities of members of a social network associated with the processing system in a status window of the display; presenting, by the processing system, a portion of the first media content associated with the first media source of the plurality of media sources associated with the first exemplar based on the first information captured from the plurality of media sources responsive to the selection of the first exemplar; receiving, by the processing system, a first encoded data stream representing the first media content from the first media source of the plurality of media sources responsive to the selection of the first exemplar; decoding, by the processing system, the first encoded data stream to generate a first media stream of the first media content; sending, by the processing system, a request for a characteristic to a media device; receiving, by the processing system, the characteristic from the media device; encoding, by the processing system, the first media stream according to characteristic of the media device that is communicatively coupled to the processing system; and transmitting, by the processing system, the first media stream to the media device for presentation at the media device.

19. The method of claim 18, comprising presenting, by the processing system, the first media stream at the display.

20. The method of claim 18, wherein one of the plurality of media sources comprises a set-top box device for receiving programming from a service provider.

* * * * *